(12) United States Patent
Frattinger et al.

(10) Patent No.: US 8,690,682 B1
(45) Date of Patent: Apr. 8, 2014

(54) BROWSER BASED WAGERING GAME SYSTEMS AND CONFIGURATION

(75) Inventors: Christopher J. Frattinger, Sparks, NV (US); Matthew J. Ward, Northbrook, IL (US)

(73) Assignee: WMS Gaming, Inc., Waukegan (IL)

( * ) Notice: Subject to any disclaimer, the term of this patent is extended or adjusted under 35 U.S.C. 154(b) by 192 days.

(21) Appl. No.: 13/116,726

(22) Filed: May 26, 2011

Related U.S. Application Data

(60) Provisional application No. 61/348,469, filed on May 26, 2010.

(51) Int. Cl.
*G06F 17/00* (2006.01)
(52) U.S. Cl.
USPC ............... 463/42; 463/40; 463/16; 463/25
(58) Field of Classification Search
USPC ........................... 463/42, 16, 25, 40
See application file for complete search history.

(56) References Cited

U.S. PATENT DOCUMENTS

| | | | |
|---|---|---|---|
| 5,129,652 A | 7/1992 | Wilkinson et al. | |
| 6,311,976 B1 | 11/2001 | Yoseloff | |
| 6,606,659 B1 * | 8/2003 | Hegli et al. | 709/225 |
| 6,860,810 B2 | 3/2005 | Cannon et al. | |
| 7,867,083 B2 * | 1/2011 | Wells et al. | 463/29 |
| 7,883,413 B2 | 2/2011 | Paulsen | |
| 7,918,738 B2 | 4/2011 | Paulsen | |
| 7,946,922 B2 | 5/2011 | Yin | |
| 8,241,116 B2 * | 8/2012 | Ocko et al. | 463/29 |
| 2002/0049814 A1 * | 4/2002 | Yoo | 709/205 |
| 2003/0073494 A1 | 4/2003 | Kalpakian et al. | |
| 2003/0188306 A1 | 10/2003 | Harris et al. | |
| 2004/0242322 A1 | 12/2004 | Montagna et al. | |
| 2005/0239546 A1 | 10/2005 | Hedrick et al. | |
| 2006/0111172 A1 | 5/2006 | Walker et al. | |
| 2006/0194633 A1 | 8/2006 | Paulsen | |

(Continued)

FOREIGN PATENT DOCUMENTS

| | | |
|---|---|---|
| EP | 1799318 | 3/2006 |
| KR | 1020000024559 | 5/2000 |

(Continued)

OTHER PUBLICATIONS

"U.S. Appl. No. 13/204,203 Office Action", Jul. 5, 2013, 16 pages.

(Continued)

*Primary Examiner* — Michael Cuff
(74) *Attorney, Agent, or Firm* — DeLizio Gillam, PLLC

(57) ABSTRACT

A wagering game system and its operations are described herein. In embodiments, the operations can include presenting a web browser on a display associated with a wagering game machine and receiving a request to present wagering game content on the display, via the web browser. The operations can further include determining a web address stored in a setting associated with a wagering game machine and sending the web address associated with the wagering game machine to a wagering game server. The wagering game server is configured to provide a webpage document described in the web address. The web address can be stored in the setting prior to the request to present the wagering game content on the display. The operations can further include receiving the webpage document from the wagering game server; and presenting the webpage document on the display of the wagering game machine via the web browser.

27 Claims, 6 Drawing Sheets

(56) References Cited

U.S. PATENT DOCUMENTS

| | | |
|---|---|---|
| 2006/0287074 A1 | 12/2006 | Walker et al. |
| 2007/0077978 A1 | 4/2007 | Walker et al. |
| 2008/0076548 A1 | 3/2008 | Paulsen |
| 2008/0155006 A1* | 6/2008 | Franklin et al. ............ 709/200 |
| 2008/0171602 A1 | 7/2008 | Patel et al. |
| 2008/0188285 A1 | 8/2008 | Roelofs |
| 2009/0062017 A1 | 3/2009 | Kelly et al. |
| 2009/0070379 A1* | 3/2009 | Rappaport ............... 707/104.1 |
| 2009/0093309 A9 | 4/2009 | Patel et al. |
| 2009/0124386 A1 | 5/2009 | LaMontagne |
| 2009/0157693 A1* | 6/2009 | Palahnuk .................... 707/10 |
| 2009/0209350 A1* | 8/2009 | Kelly et al. .................. 463/42 |
| 2009/0280891 A1 | 11/2009 | Filipour et al. |
| 2009/0286585 A1 | 11/2009 | Walker |
| 2010/0009743 A1 | 1/2010 | Amaitis et al. |
| 2010/0077321 A1* | 3/2010 | Shen et al. .................. 715/760 |
| 2010/0125732 A1* | 5/2010 | Cha et al. .................... 713/166 |
| 2010/0199160 A1* | 8/2010 | Klassen et al. ............. 715/210 |
| 2010/0210345 A1 | 8/2010 | Berman et al. |
| 2010/0217686 A1* | 8/2010 | Craig et al. .................. 705/27 |
| 2010/0227662 A1 | 9/2010 | Speer et al. |
| 2010/0261517 A1 | 10/2010 | Gomez et al. |
| 2010/0287070 A1* | 11/2010 | Santeufemia et al. ......... 705/27 |
| 2010/0304848 A1* | 12/2010 | Detlefsen et al. ............. 463/25 |
| 2011/0009188 A1 | 1/2011 | Adiraju et al. |
| 2011/0014975 A1 | 1/2011 | Grabiec et al. |
| 2011/0028203 A1 | 2/2011 | Agarwal et al. |
| 2011/0053672 A1* | 3/2011 | Gagner et al. ................ 463/16 |
| 2011/0107241 A1* | 5/2011 | Moore ........................ 715/760 |
| 2011/0122870 A1* | 5/2011 | Dixon et al. ................. 370/389 |
| 2011/0207525 A1 | 8/2011 | Allen et al. |
| 2011/0263318 A1 | 10/2011 | Agarwal et al. |
| 2011/0312410 A1 | 12/2011 | Aoki et al. |
| 2012/0157193 A1 | 6/2012 | Arezina et al. |
| 2012/0277005 A1 | 11/2012 | Blackburn et al. |
| 2012/0322550 A1 | 12/2012 | Antkowiak et al. |

FOREIGN PATENT DOCUMENTS

| | | |
|---|---|---|
| KR | 1020000036733 | 7/2000 |
| KR | 1020000036734 | 7/2000 |
| KR | 1020010096297 | 11/2001 |
| KR | 1020020011293 | 4/2002 |
| KR | 1020030088840 | 6/2005 |
| WO | WO2006033986 | 3/2006 |
| WO | WO-2006039306 | 4/2006 |
| WO | WO-2006105182 | 10/2006 |
| WO | WO2007055774 | 5/2007 |
| WO | WO2008021051 | 2/2008 |
| WO | WO-2009026305 | 2/2009 |
| WO | WO-2009026307 | 2/2009 |
| WO | WO-2009026308 | 2/2009 |
| WO | WO-2009026309 | 2/2009 |
| WO | WO2010056924 | 5/2010 |
| WO | WO-2012019167 | 2/2012 |

OTHER PUBLICATIONS

"U.S. Appl. No. 13/581,722 Office Action", Jul. 5, 2013, 26 pages.
"U.S. Appl. No. 13/204,203 Final Office Action", Oct. 5, 2012, 18 pages.
"U.S. Appl. No. 13/204,269 Final Office Action", Jan. 30, 2013, 25 pages.
"PCT Application No. PCT/US11/46860 International Preliminary Report on Patentability", Aug. 6, 2012, 4 pages.
"U.S. Appl. No. 13/204,203 Office Action", Jun. 21, 2012, 22 pages.
"U.S. Appl. No. 13/204,269 Office Action", Jul. 16, 2012, 24 pages.
U.S. Appl. No. 13/204,203, filed Aug. 5, 2011, Antkowiak, Ryan D., et al.
U.S. Appl. No. 13/204,269, filed Aug. 5, 2011, Antkowiak, Ryan D., et al.
"PCT Application No. PCT/US11/46860 International Search Report", Jan. 5, 2012, 9 pages.
"U.S. Appl. No. 13/581,722 Office Action", Feb. 6, 2014, 14 Pages.
U.S. Appl. No. 14/106,310, filed Dec. 13, 2013, Antkowiak, Ryan D., et al.
U.S. Appl. No. 14/106,415, filed Dec. 13, 2013, Antkowiak, Ryan D., et al.

* cited by examiner

BROWSER BASED WAGERING GAME SYSTEMS AND CONFIGURATION

RELATED APPLICATIONS

This application claims the priority benefit of U.S. Provisional Application No. 61/348,469 filed May 26, 2010.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

TECHNICAL FIELD

Embodiments of the inventive subject matter relate generally to wagering game systems and networks that, more particularly, configure wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Some of those machines, features, and enhancements may require advanced configuration. Wagering game providers encounter many challenges configuring wagering game machines to properly present and control content consistently. Further, wagering game providers encounter challenges keeping content up to date on wagering game machines.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
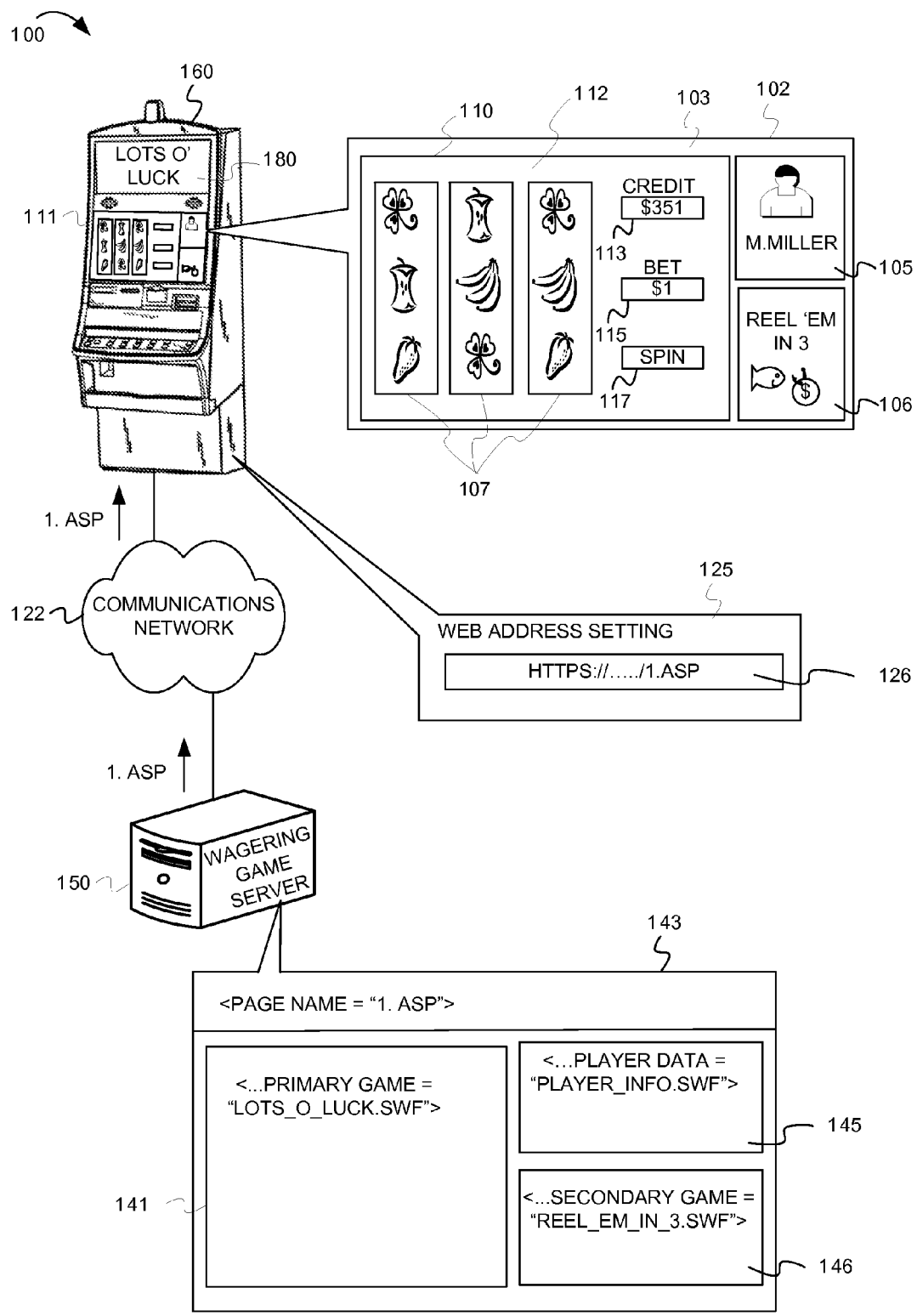
FIG. 1 is an illustration of serving web content using a configured web address and displaying the web content in a web browser on a wagering game machine, according to some embodiments.

This description of the embodiments is divided into six sections. The first section provides an introduction to embodiments. The second section describes example operating environments while the third section describes example operations performed by some embodiments. The fourth section describes additional example embodiments while the fifth section describes additional example operating environments. The sixth section presents some general comments.

Introduction

This section provides an introduction to some embodiments.

Providers of wagering game entertainment ("gaming providers"), such as casinos, game manufacturers, etc., provide a multitude of wagering game machines with a variety of wagering games. Gaming providers configure wagering game machines so that the wagering game machines present data consistently and without errors. A gaming provider typically has to configure a wagering game machine by performing several procedures. For example, a gaming provider downloads and stores wagering game content (e.g., wagering game application files) on the wagering game machine. The gaming provider installs wagering game client applications on the wagering game machine, and configures the wagering game machine to execute, or launch, the wagering game application, such as during an initialization or boot up procedure of a wagering game machine, during a power cycle, etc. The gaming provider also downloads and/or maintains supporting data (e.g., firmware, supporting software, configuration files, templates, etc.) that supports or accompanies the client applications, which may also require maintenance and configuration. Further, whenever the wagering game machine needs maintenance or updating to the content or supporting data, the gaming provider accesses the wagering game machine directly, loads new or updated content and supporting data onto the wagering game machine, and reconfigures the wagering game machine to run the new or updated content and supporting data.

Some embodiments of the present invention, however, present ways to configure wagering game machines with minimal effort, without needing to download local content or supporting software and without needing to regularly access the wagering game machine manually to provide updates to content or supporting data. For example, a wagering game system, according to some embodiments of the invention, can provide gaming providers with a configuration tool that can configure wagering game machines with web browsers. The web browsers can present wagering game content via webpages on a display of the wagering game machine. The webpages can include all, or significant portions, of wagering game content used during a wagering game session. The gaming providers can store the webpages on a web server, or on other network locations or devices, such as on a wagering game server. The gaming providers can use the configuration tool to configure the wagering game machines with web addresses that access webpages for an advertised theme, denomination, etc. at the wagering game machine. The webpages contain the wagering game content related to the theme, denomination, etc. and the wagering game machine can access the web address, load the webpage, and present the webpage using the web browser.

In some embodiments, a web server can dynamically generate webpages based on identification information (e.g., unique identifiers) associated with a wagering game machine. Thus, in some embodiments, gaming providers can configure servers to generate webpages dynamically for wagering game machines without needing to manually access and manually configure wagering game machines. Further, by using webpages, a gaming provider can configure content for wagering game machines at a server level, ensuring that content is consistent and up to date across all wagering game machines. Further, a gaming provider can test an appearance of a webpage from a browser built into the configuration tool at a configuration server. Thus, the gaming provider can test the appearance of how wagering game content will appear at a wagering game machine without having to access the wagering game machine manually. In addition, a gaming provider can use the configuration tool to create a webpage that has different types of wagering game content, different applications, different game themes, etc. in different locations or sections of the webpage. The webpage eliminates the need for multiple cross communications between client and server other than webpage communications. Further, by presenting web content on wagering game machines using webpages, a wagering game machine can recover more quickly and easily from power cycles because the wagering game machine does not have to perform a lengthy initialization procedure. Furthermore, the wagering game machine can cache web content that persists across power cycles, also providing quicker recovery. In addition, wagering game content can be more secure when stored and delivered as server-based web content versus being stored on each individual wagering game machine.

FIG. 1 is a conceptual diagram that illustrates an example of serving web content using a configured web address and displaying the web content in a web browser on a wagering game machine, according to some embodiments. In FIG. 1, a wagering game system ("system") 100 includes a wagering game machine 160 connected to a wagering game server 150 via a communications network 122. The wagering game machine 160 can present a web browser 102 on a display of the wagering game machine 160. The web browser 102 can be configured to hide user-controls, dropdown menus, borders, or other objects that indicate that the web browser 102 is a web browser application. The web browser 102 can use a webpage 103 as a sole source of wagering game content presented on the wagering game machine 160. The web browser 102 can appear to a player during a wagering game session to cover the entire display, or in other words encompass an entire display area 111, so that the display area 111 appears similar to a background window of the wagering game machine 160.

The wagering game server 150 can provide the webpage 103, which contains gaming content that a player account can utilize while logged on to the wagering game machine 160 during a wagering game session in a casino. The webpage 103 can be divided into different parts, such as a primary game section 110, a secondary content section 106, and one or more additional sections (e.g., a player information section 105). In the primary game section 110, the webpage 103 can present a primary wagering game application 112 that provides, for example, a slot game (e.g., the "Lots O'Luck" slot game advertised in the top-box display 180). The slot game can include reels 107, a credit meter 113, a bet meter 115, and a spin button 117. The primary wagering game application 112 can be a web application file configured for web display, such as a vector graphic animation (e.g., Adobe™ Flash) with scripting (e.g., ActionScript) that controls game functionality within the vector graphic animation.

The wagering game server 150 stores the webpage 103 as a webpage document 143. The webpage document 143 can include web document code such as hypertext markup language (HTML), extensible markup language (XML), C#, PHP, JavaScript, AJAX, etc. The webpage document 143 can be an HTML document (e.g., have an ".HTML" or ".HTM" file extension), an Active Server Page or Microsoft™ ASP.NET document (e.g., a webpage document with an ".ASP" file extension), an open source code (e.g., a webpage document with a .PHP file extension), etc. For instance, in FIG. 1, the webpage document 143 is an ASP.NET type of webpage document named "1.ASP." The webpage document 143 can include different webpage document sections, such as a primary game section 141, a secondary content section 146, and a player information section 145. The system 100 can embed web application files into the different webpage document sections. For example, the system 100 can embed a first web application file "LOTS_O_LUCK.SWF," in the primary game section 141. The system 100 can also embed a second web application file "REEL_EM_IN_3.SWF," into the secondary content section 146. Further, the system 100 can embed a third web application file "PLAYER_INFO.SWF" in the player information section 145. The web browser 102 can be configured to present the webpage document 143 as well as any type of embedded web application files configured for web display (e.g., the "LOTS_O_LUCK.SWF" web application file, the "PLAYER_INFO.SWF" web application file, and the "REEL_EM_IN_3.SWF" web application file).

To access and present the webpage 103, the wagering game machine 160 provides a web address 126, associated with a web address setting 125, to the wagering game server 150. In some embodiments, the web address setting 125 is stored on a memory location belonging to, or associated with, the wagering game machine 160. The wagering game server 150 receives the web address 126 and determines, from the web address, that the wagering game machine 160 should present the webpage document 143. The wagering game server 150 then provides the webpage document 143 to the wagering game machine 160. The wagering game machine 160 receives the webpage document 143 and loads the webpage document 143 into the web browser 102. Then, the web browser 102 presents the webpage document 143 as the webpage 103.

In some embodiments, the communications network 122 can be a private network within a casino. In other embodiments, however, the communications network 122 can be the Internet or World Wide Web. The wagering game server 150 can deliver the webpage document 143 to the wagering game machine 160 using a hypertext transfer protocol (HTTP). Consequently, the wagering game server 150 may also be referred to as a web server.

Further, some embodiments of the inventive subject matter may include examples of configuring browser based wagering game systems in a network wagering venue (e.g., an online casino, a wagering game website, a wagering network, etc.) using a communication network, such as the communications network 122 in FIG. 1. Some embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, in some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
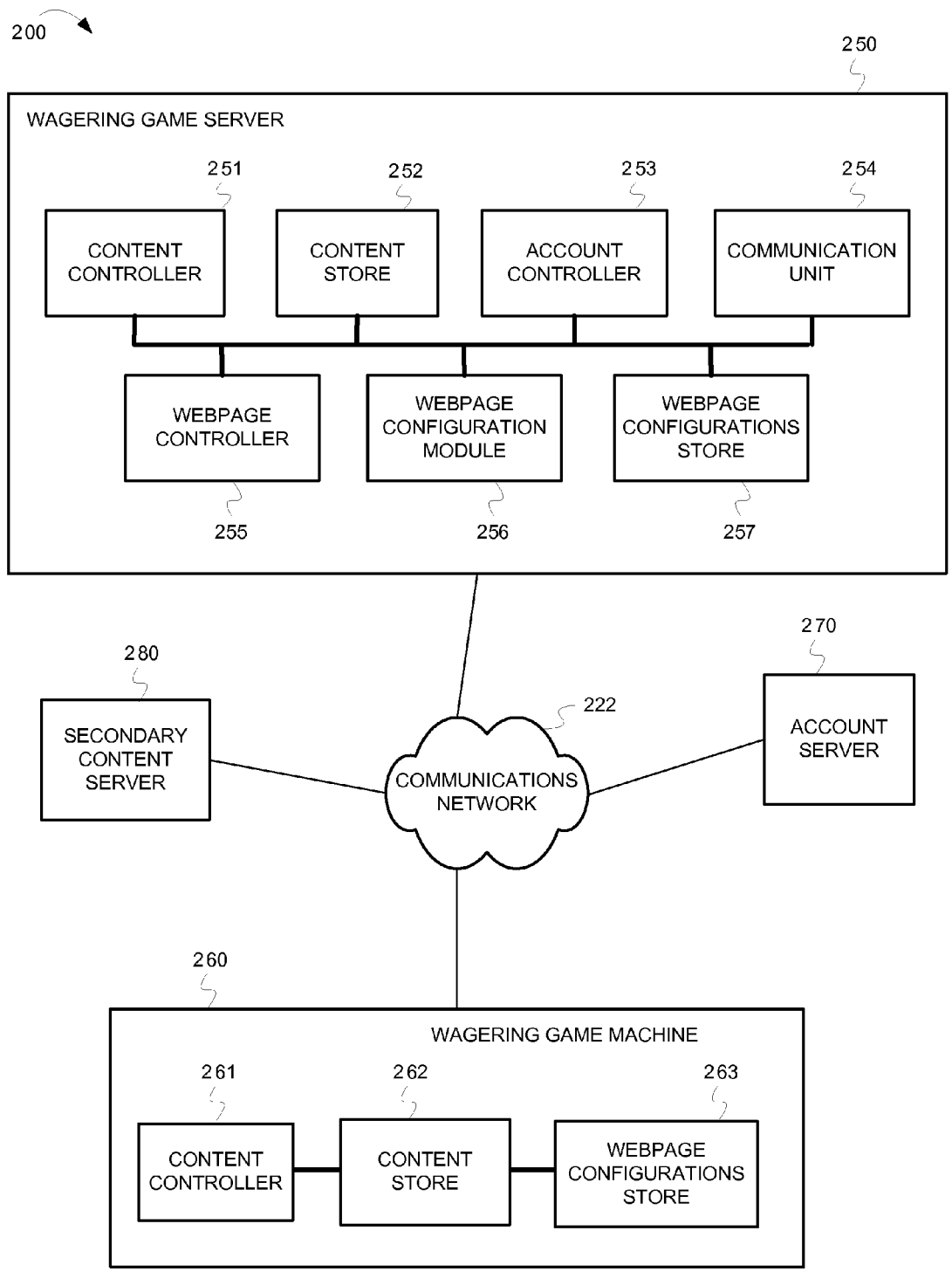
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store and track player information, such as identifying information (e.g., avatars, screen name, account identification numbers, etc.) or other information like financial account information, social contact information, etc. The account server 270 can contain accounts for social contacts referenced by the player account. The account server 270 can also provide auditing capabilities, according to regulatory rules, and track the performance of players, machines, and servers.

The wagering game system architecture 200 can also include a wagering game server 250 configured to control wagering game content, provide random numbers, and communicate wagering game information, account information, and other information to and from a wagering game machine 260. The wagering game server 250 can include a content controller 251 configured to manage and control content for the presentation of content on the wagering game machine 260. For example, the content controller 251 can generate game results (e.g., win/loss values), including win amounts, for games played on the wagering game machine 260. The content controller 251 can communicate the game results to the wagering game machine 260. In some embodiments, the content controller 251 communicates the game results to web application files embedded in a webpage that the wagering game machine 260 presents via a web browser. The content controller 251 can also generate random numbers and provide them to the wagering game machine 260 so that the wagering game machine 260 can generate game results. For example, the wagering game machine 260 can generate a game result and provide it to a web application file embedded in the webpage presented on the web browser. The wagering game server 250 can also include a content store 252 configured to contain content to present on the wagering game machine 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks. The wagering game server 250 can also include a webpage controller 255 configured to control generation, access, delivery, etc. of webpages. The wagering game server 250 can also include a webpage configuration module 256 configured to configure webpage templates. For example, the webpage configuration module 256 can be configured to present a graphical user interface for an operator to configure webpages using design tools and templates. In some embodiments, the wagering game server 250, and/or the webpage configuration module 256, may be referred to as a configuration server. The wagering game server 250 can also include a webpage configurations store 257 configured to store configurations (e.g., settings, files, etc.) related to generation, access, delivery, etc. of webpages. In some embodiments, the webpage configurations store 257 may be referred to interchangeably as a data store for configuration information, such as a database and/or may be used in conjunction with a database. In some embodiments, the wagering game server 250 functions as a web server that can control and present an online wagering games using webpages via the Internet. The wagering game server 250 can also be configured to present multiple wagering game applications on the wagering game machine 260 via a wagering game website, or other gaming-type venue accessible via the Internet. The wagering game server 250 can also host an online social networking website. The wagering game server 250 can also include other devices, servers, mechanisms, etc., that provide functionality (e.g., controls, webpages, applications, etc.) that web users can use to connect to a social networking application and/or website and utilize social networking and website features (e.g., communications mechanisms, applications, etc.).

The wagering game system architecture 200 can also include the wagering game machine 260 configured to present wagering games and receive and transmit web pages and configuration information related to web content and web page metadata (e.g., web pages, web addresses, web configuration settings, web page properties, browser configuration settings, etc.). The wagering game machine 260 can include a content controller 261 configured to manage and control content and presentation of content on the wagering game machine 260, for example, by controlling a web browser application and presenting wagering game content via web pages on the web browser. The wagering game machine 260 can also include a content store 262 configured to contain content to present on the wagering game machine 260. In some embodiments, the content store 262 stores webpages, web application files, or other web content. In some embodiments, the content store can also store client applications that the wagering game machine 260 can present in addition to web pages. The wagering game machine 260 can also include a webpage configurations store 263 configured to store configurations (e.g., settings) related to webpages, such as a webpage address, a unique identifier for the wagering game machine 260, of other information that the wagering game server 250 can use to determine webpages that the wagering game machine 260 can present using a web browser application.

The wagering game system architecture 200 can also include a secondary content server 280 configured to provide content and control information for secondary games and other secondary content available on a wagering game network (e.g., secondary wagering game content, promotions content, advertising content, player tracking content, web content, etc.). The secondary content server 280 can provide "secondary" content, or content for "secondary" games presented on the wagering game machine 260. The secondary content server 280 can also provide web application files that the wagering game server 250 can embed into web pages and provide to the wagering game machine 260. "Secondary" in some embodiments can refer to an application's importance or priority of the data. In some embodiments, "secondary" can refer to a distinction, or separation, from a primary content (e.g., a separate web application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), or between web application files, thus becoming, or falling under the control of, primary content or primary applications or primary web application files, and vice versa.

Each component shown in the wagering game system architecture 200 is shown as a separate and distinct element connected via a communications network 222. However, some functions performed by one component could be performed by other components. Furthermore, the components shown may all be contained in one device, but some, or all, may be included in, or performed by, multiple devices, as in the configurations shown in FIG. 2 or other configurations not shown. For example, the account manager 253 and the communication unit 254 can be included in the wagering game machine 260 instead of, or in addition to, being a part of the wagering game server 250. Further, in some embodiments, the wagering game machine 260 can determine wagering game outcomes, generate random numbers, etc. instead of, or in addition to, the wagering game server 250.

The wagering game machines described herein (e.g., wagering game machine 260) can take any suitable form, such as floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein. Machine-readable storage media includes any mechanism that stores information in a form readable by a machine (e.g., a wagering game machine, computer, etc.). For example, machine-readable storage media includes read only memory (ROM), random access memory (RAM), magnetic disk storage media, optical storage media, flash memory machines, etc. Some embodiments of the invention can also include machine-readable signal media, such as any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
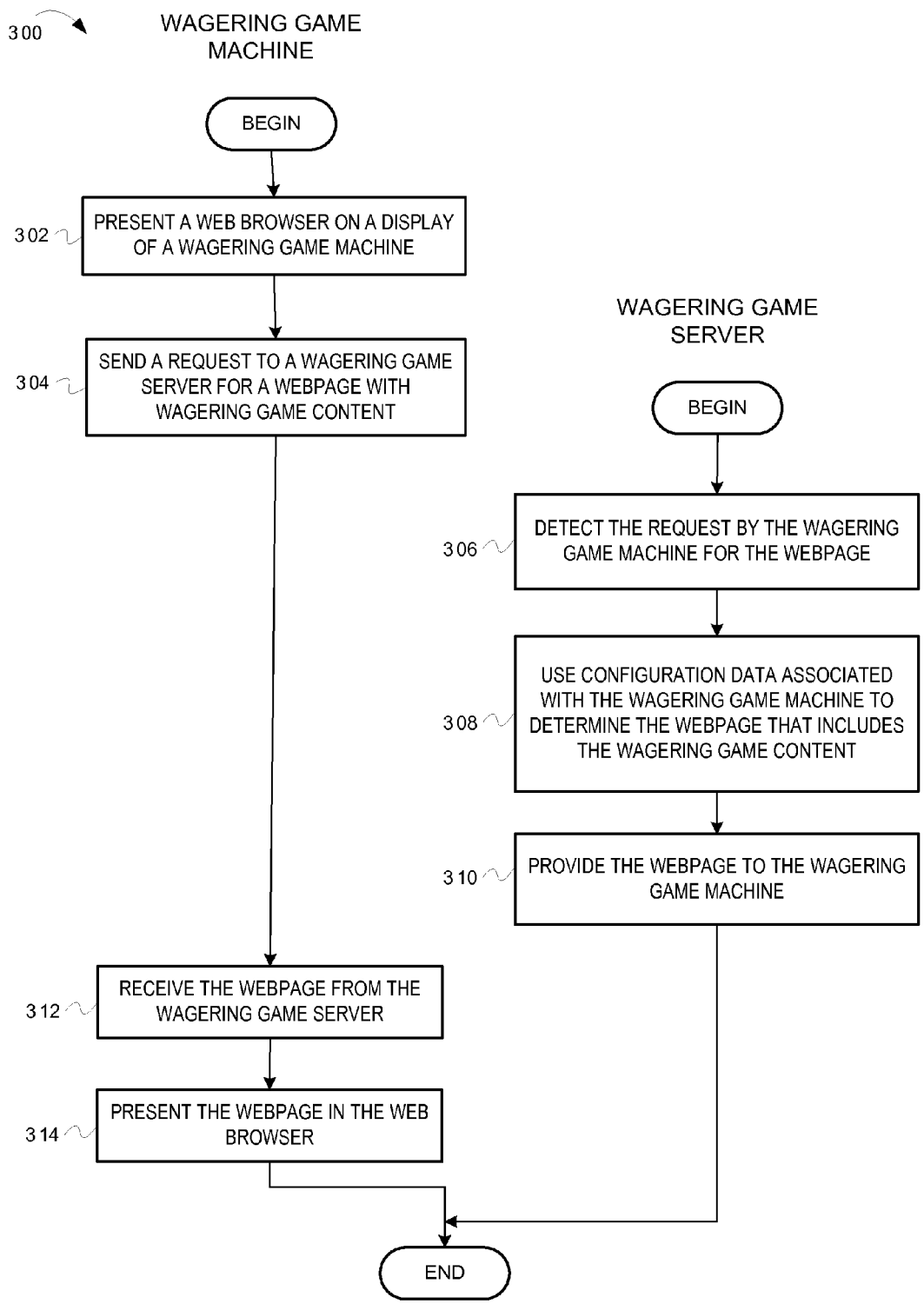
FIG. 3 is a flow diagram 300 illustrating serving and presenting web content in a web browser on a wagering game machine, according to some embodiments.
Figure 4:
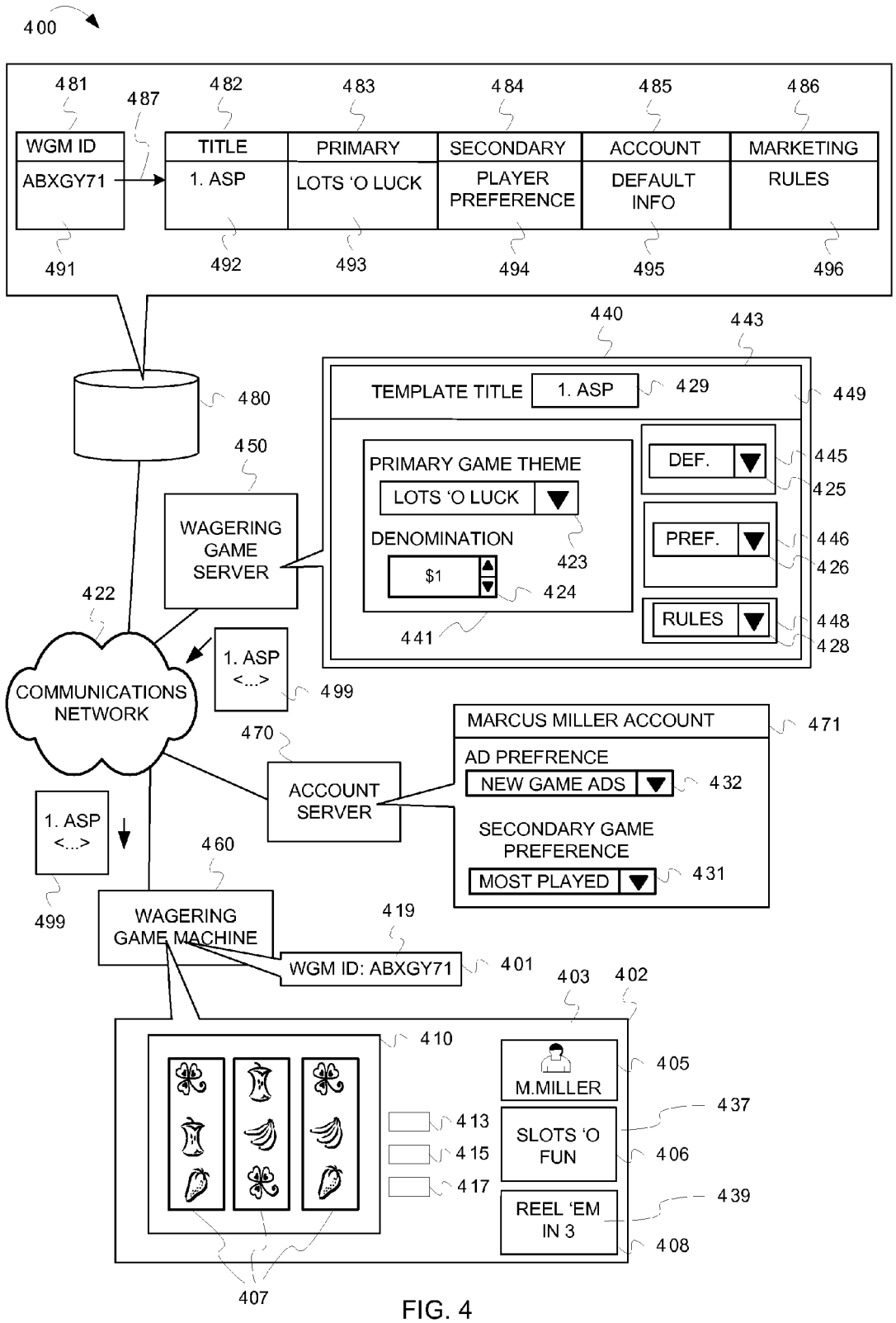
FIG. 4 is an illustration of generating a webpage dynamically using a wagering game machine identifier and a preconfigured webpage template, according to some embodiments.

FIG. 3 is a flow diagram ("flow") 300 illustrating serving and presenting web content in a web browser on a wagering game machine, according to some embodiments. FIGS. 1 and 4 are conceptual diagrams that help illustrate the flow of FIG. 3, according to some embodiments. This description will present FIG. 3 in concert with FIGS. 1 and 4. In FIG. 3, the flow 300 begins at processing block 302, where a wagering game machine presents a web browser on a display of the wagering game machine. For example, a wagering game machine can launch the web browser on a primary display for the wagering game machine. The web browser can engross, or encompass, an entire display area of a display for the wagering game machine.

The flow 300 continues at processing block 304, where the wagering game machine sends a request to a wagering game server for a webpage with wagering game content. The wagering game machine can send the request outside a wagering game session, or in other words, when a player is not logged on to the wagering game machine. For instance, the request can be from a start up or initialization procedure for the wagering game machine. In some embodiments, the wagering game machine can send a request without sending a web address, such as an instruction for the wagering game server to determine an appropriate webpage for the wagering game machine and then send the appropriate webpage to the wagering game machine. In other embodiments, the request can be initiated from a configuration server that wants to test presentation of wagering game content on the wagering game machine. The configuration server can send the request to the wagering game machine or directly to the wagering game server.

The flow 300 continues at processing block 306, where the wagering game server detects the request by the wagering game machine for the webpage.

The flow 300 continues at processing block 308, where the system uses configuration data associated with the wagering game machine to determine the webpage that includes the wagering game content. In some embodiments, the wagering game server can access and use a web address associated with the wagering game machine and serve a webpage described in the web address, similarly as described in FIG. 1. In some embodiments, the web address is associated with the wagering game machine prior to the request to present the wagering game content on the display. In some embodiments, the wagering game machine can send the configuration data to the web server with the request. The web address can be a fixed, or static, web address. In other words, the web address can be a link, or locator, to a static webpage document. For example, the web address can be a uniform resource locator (e.g., http://server.casino.com/1.asp) or an IP address (e.g., 134.34.3.4) associated with the wagering game machine. The web address can be stored in a setting during a configuration session. For instance, the system can present a graphical user interface through which an administrative user can input (e.g., type, select from a dropdown, etc.) the web address and store the web address in the setting. In some embodiments, the system can store the setting, with the web address, on any memory storage location that is associated with the wagering game machine. The memory storage location can be on the wagering game machine or the memory location can be physically external to the wagering game machine (e.g., on a network server, on a flash drive, in a database, etc.). In some embodiments, the system is configured to store the setting via a configuration process for the wagering game machine. The wagering game machine can send the web address by initiating an operation of the web browser that navigates to, or locates the web address (e.g., operation to "go to," "open," "begin session," etc.). For example, the wagering game machine can copy the web address from the storage location associated with the setting and insert the web address into a hidden address field of the web browser. In other embodiments, the web browser can be configured to store the web address as metadata (e.g., as a default starting location or "home page" for the web browser). Thus, the setting can be integrated with configuration options for the web browser.

In some embodiments, the wagering game server can use a wagering game machine identifier associated with the wagering game machine and dynamically generate the webpage using a pre-configured template and stored data. In some embodiments, the wagering game server can dynamically create configurations via a service. For example, the wagering game server can look up configuration data (e.g., settings, configuration instructions, webpage information, etc.) in a database. The configuration data can specify how a particular wagering game machine should be configured and how webpages should be generated. The wagering game server generates a webpage based on the configuration data and downloads the webpage to the wagering game machine. In some embodiments, the wagering game server can search for a reference, or entry, of the configuration data in a database. For instance, the database can include an entry, or value, for the wagering game machine identifier. The wagering game server can find an accompanying, or related, entry or value in the database for a webpage template that is related to entry for the value of the wagering game identifier. The wagering game server can then access and use a webpage template associated with the value in the database for the webpage template. The database can also include additional configuration settings. The wagering game server can use the webpage template and the additional configuration settings to generate a webpage document. FIG. 4 illustrates an example of generating a webpage using a webpage template and configuration data.

In FIG. 4, a wagering game system ("system") 400 includes a wagering game machine 460 connected to a wagering game server 450 via a communications network 422. Also included in the system 400 are an account server 470 and a database 480, which are also connected to the communications network 422. The account server 470 host can host a wagering game account (e.g., player account 471 for the user "Marcus Miller"). The wagering game machine 460 can present a web browser 402. The web browser 402 can present a webpage 403 served by the wagering game server 450. A user (i.e., Marcus Miller) can log in to the player account 471 via the web browser 402 presented by the wagering game machine 460. The wagering game server 450 can provide gaming content. The webpage 403 can present the gaming content (e.g., a slot game that includes reels 407, a credit meter 413, a bet meter 415, and a spin button 417), which the player account 471 can utilize during a wagering game session in a casino while logged on to the wagering game machine 460.

In some embodiments, the wagering game server 450 can login an administrative user account and present a graphical user interface 440 that the administrative user can use as a webpage designer tool to create a webpage. In some embodiments, the graphical user interface 440 can provide controls and other features that the administrative user can use to configure a webpage template 443. The wagering game server 450 can detect data inputs and/or user selections by the administrative user (e.g., via user inputs at a keyboard, via user selections of controls, etc.). The webpage template 443 can be divided into various template sections. For example, the webpage template 443 can include a title section 449, a first template section 441 related to a primary wagering game content, a second template section 445 related to a player's information content, a third template section 446 related to secondary wagering game content, and a fourth template section 448 related to advertising content. The system 400 can detect, via user input through the graphical user interface 440, data inputs and/or user selections of one of the controls in one of the sections of the webpage template 443. For example, the system 400 can detect a user input of data in a title description field 429 (e.g., the administrative user types in the value "1.ASP" into the title description field 429). The system 400 can store the value entered into the title description field 429 in a data location 492 related to a template title setting 482. The value in the title description field 429 can refer to the name of the webpage template 443. The system 400 can generate a webpage document that has the same name as the value in the title description field 429 (e.g., a webpage document 499 named "1.ASP"). The webpage template 443 can include any webpage code necessary to generate the webpage document 499, which appears as the webpage 403 when presented in the web browser 402.

Furthermore, the system 400 can detect a selection, by the administrative user, of a first dropdown control 443 through which the administrative user can select a wagering game theme or title of a primary wagering game. The system 400 can also detect a selection, by the administrative user, of a money value control 424, to set a denomination value for the primary wagering game. For instance, the system 400 can detect a selection by the administrative user of a value (i.e., "Lots 'O Luck") in the first dropdown control 423 and a value (i.e., $1) in the money value control 424. The system 400 can store the values of the first dropdown control 423 and the money value control 424 in the database 480. For instance, the system 400 stores the "Lots 'O Luck" value in a data location 493 related to a primary content section setting 483.

The system 400 can also detect selection of other controls, such as the second dropdown control 425 in the second section 445. The second dropdown control 425 can specify a configuration setting that indicates a type of player information to be presented via the second section 445. For instance, the system 400 detects that an administrative user selects a dropdown values of "Def." which is short for "Default." The "Def." setting indicates that the second section 445 will show player information that the system 400 defines as default (e.g., a depiction of an avatar and a name of a player account). The system 400 can store the value of the second dropdown control 425 in the database 480 at a data location 495 related to an account content section setting 485.

Further, the system 400 can detect selection of a third dropdown control 426 in the third section 446. The third dropdown control 426 can specify a configuration setting that indicates a type of player information to be presented via the third section 446. For instance, the system 400 detects that an administrative user selects a dropdown values of "Pref." which is short for "Preference." The "Pref." setting indicates that the third section 446 will show secondary wagering game content according to a first player setting 431 indicating a type of preferred secondary wagering game content (e.g., the player indicates a preference to show in the second section 446 the "Most Played" secondary wagering games available). The system 400 can store the value of the third dropdown control 426 in the database 480 at a data location 494 related to a secondary content section setting 484.

In addition, the system 400 can detect selection of a fourth dropdown control 428 in the fourth section 448. The fourth dropdown control 428 can specify a configuration setting that indicates a type of player information to be presented via the fourth section 448. For instance, the system 400 detects that an administrative user selects a dropdown value of "Rules" which indicates that the fourth section 448 will show advertising content according to rules and conditions that occur during a wagering game session. For example, the rules may refer to a second player setting 432, if set by the a player account, indicating a type of preferred advertising content (e.g., the player indicates a preference to show in the fourth section 448 "New Game Ads" or advertisement for newly released wagering games). If the player account, however, does not set a preference in the second player setting 432, the rules may refer to other conditions, states, events, etc. that occur on the system 400. The system 400 can store the value of the fourth dropdown control 428 in the database 480 at a data location 496 related to a marketing content section setting 486.

The system 400 can use the webpage template 443 to generate the webpage document 499 that appears as the webpage 403 when presented in the browser 402. In some embodiments, the system 400 can dynamically generate the webpage document 499 using the information stored in the database 480. The system 400 can ascertain a unique identifier 419 that uniquely identifies the wagering game machine 460. The unique identifier 419, for example, may be a serial number for the wagering game machine 460. The unique identifier 419 is stored in an identification setting 401 associated with (e.g., stored on, linked to, etc.) the wagering game machine 460. The wagering game server 450 can obtain the unique identifier 419 from the wagering game machine 460 and use the unique identifier 419 to generate the webpage document 499 by using web document code stored in the webpage template 443. The web document code defines a structure, or layout, of a webpage document. The wagering game server 450 can refer to the settings stored in the database 480 to populate, or embed, gaming content (e.g., web application files, Flash files, etc.) into template layout sections (e.g., template layout sections 441, 445, 446, 448) of the webpage template 443. The template layout sections 441, 445, 446, 448 correspond to webpage sections 410, 405, 406, 408 of the webpage 403. The wagering game server 450 reads the values in settings 483, 484, 485 and 486, which correspond to information from the template layout sections 441, 445, 446, 448. For instance, the values in the settings 483, 484, 485 486 identify types of gaming content for each of the template layout sections 441, 445, 446, 448. The wagering game server 450 can generate the webpage document 499, using web code from webpage template 443 that corresponds to the template layout sections 441, 445, 446, 448. The wagering game server 450 can then embed web applications into webpage document 499 based on the web code for the template layout sections 441, 445, 446, 448, using the values in the settings 483, 484, 485 and 486 as parameters for the web code.

For instance, the system 400 looks up the unique identifier 419 at a data location 491 associated via a relationship 487 with a wagering game machine identifier setting 481 on the database 480. The wagering game machine identifier setting 481 can be linked (e.g., via a key in a database 480) to the template title setting 482 (e.g., the value in the data location 491 links to the value in the data location 492 via the relationship 487 in a relationship table or column within the database 480). After ascertaining that the unique identifier 419 is associated with a specific webpage title in the database (e.g., associated with the "1.ASP" webpage title indicated in the data location 492) the system 400 ascertains that the webpage template 443 is the template required to generate the "1.ASP" webpage document 499. The system 400 can use the values in the settings 482, 484, 485, 486 to obtain (e.g., search for and find) web application files that correlate to the values in the settings 482, 484, 485, 486. The system 400 then embeds web application files that into the template layout sections 441, 445, 446, and 448 so that the web application files appear in the webpage sections 410, 405, 406, and 408. The wagering game server 450 provides the webpage document 499 to the wagering game machine 460 and the wagering game machine 460 provides the webpage document 499 to the web browser 402, which presents the webpage document 499 as the webpage 403.

The webpage 403 includes content specified by settings in the database 480, such as the "Lots 'O Luck" wagering game application in a primary wagering game section 410 of the webpage 403 or the default player information content in a player information section 405 of the webpage 403. The webpage 403 also includes content that may be ascertained via analysis of conditions and application of rules, as previously explained. For example, the system 400 can read the second player setting 432 indicating a player preference for most played or most popular wagering game content, then, based on the player preference, include a gaming application (e.g., the "Slots 'O Fun" wagering game application 437 which is a popular game) in a secondary content section 406 of the webpage 403. In another example, the system 400 can refer to the first player setting 432, via analysis of conditions and application to rules, which indicates a player preference for new or recently released wagering game content. The system 400 can then embed an advertisement 439 for the "Reel 'Em In 3" wagering game in an advertising section 408 of the webpage 403.

In some embodiments, the system 400 can store the webpage document 499 and serve the webpage document 499 when requested instead of dynamically generating the webpage document 499 when requested.

The flow 300 continues at processing block 310, where the wagering game server provides the webpage to the wagering game machine. For instance, as described in FIG. 4, the web server delivers the webpage document 499 to the wagering game machine 460.

The flow 300 continues at processing block 312, where the wagering game machine receives the webpage from the wagering game server.

The flow 300 continues at processing block 314, where the system presents the webpage in a web browser on the wagering game display for the wagering game machine. In some embodiments, the wagering game machine can disable any features of the web browser that would allow a player to navigate away from the webpage during a wagering game session. Further, the wagering game machine can present all gaming content for the display via the web browser, so that web browser takes up entire display area and appears indistinguishable from a background window of the operating system.

Additional Example Embodiments

According to some embodiments, a wagering game system ("system") can provide various example devices, operations, etc., to configure browser based wagering game systems. The following non-exhaustive list enumerates some possible embodiments.

- In some embodiments, the system can use a Real-Time Gaming (RTG) platform, or a video lottery terminal (VLT). For example, the VLT can be a webpage with a multi-game selection screen that has hyperlinks to different games
- In some embodiments, the system can configure a group of wagering game machines to have the same primary wagering game, but different secondary games (e.g., different types of games, fewer or lesser games, etc.). The individual wagering game machines in the group can reference different webpages that have different secondary wagering game content, but the same primary wagering game content.
- In some embodiments, the system can configure webpages for any denomination or game configuration. The system can store a set of popular configurations, with different webpages for each configuration that can use the different webpages
- In some embodiments, the system can configure a webpage to include downloadable content code. In some embodiments, the system can configure a webpage that loads as a plug-in, and the server pushes the content code to the plug-in so that the client can execute the content code. In another embodiment, however, the server can execute the content code on the server
- In some embodiments, the system can integrate third-party content (e.g., a video from YouTube) into the webpage
- In some embodiments, the system can configure a web browser on a personal computer (PC) to present wagering game content. The system can configure the web browser to hide functionality that a user can use to change the appearance of the web browser so that the web browser stays fixed
- In some embodiments, the system can synchronize presentation of content across a bank of wagering game machines by synchronizing content presentation via the webpages at the server level. Thus, some embodiments of the invention can eliminate the need for bank controllers to synchronize events of local wagering game applications at the client level.

Additional Example Operating Environments

This section describes example operating environments, systems and networks, and presents structural aspects of some embodiments.

Wagering Game Machine Architecture

Figure 5:
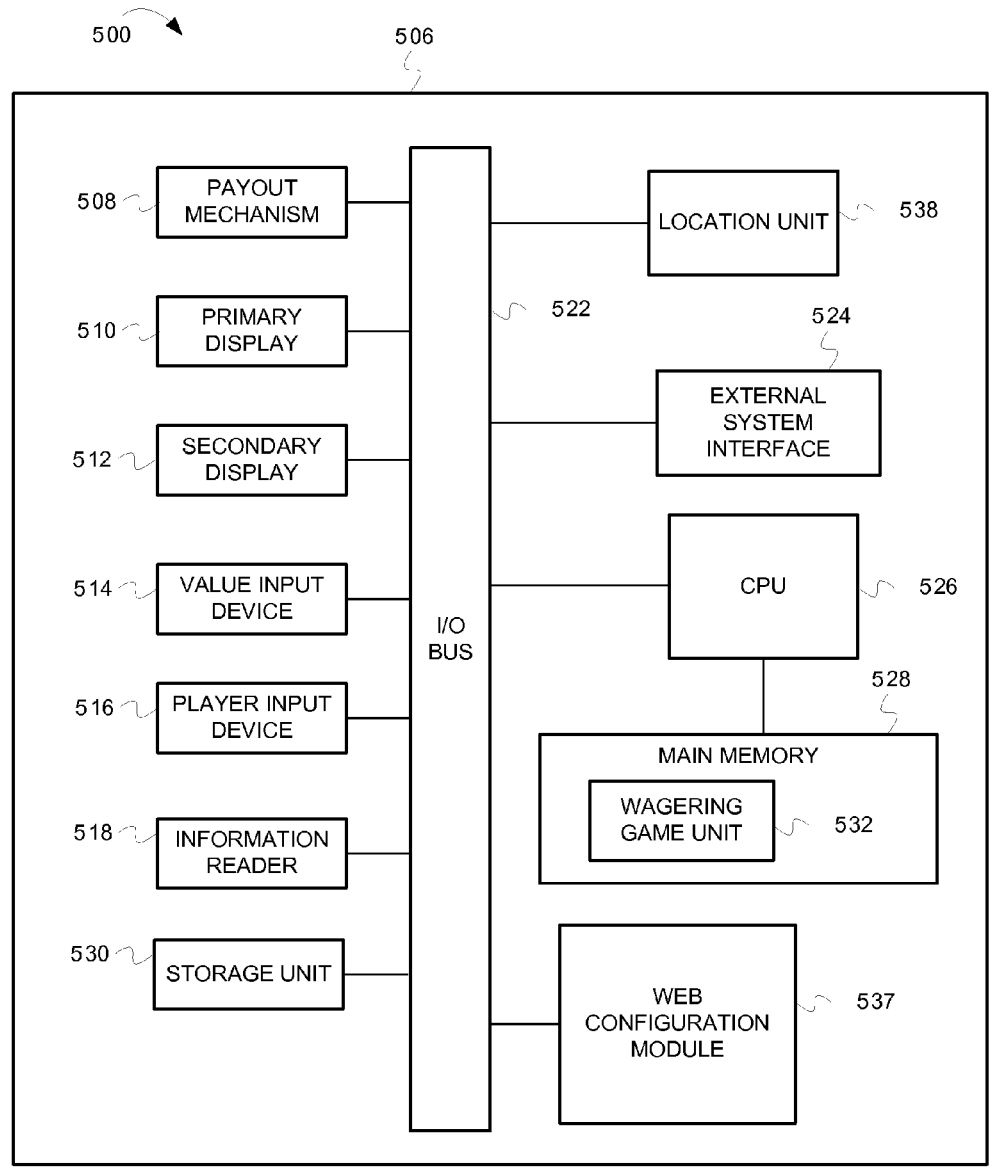
FIG. 5 is an illustration of a wagering game machine architecture 500, according to some embodiments.

FIG. 5 is a conceptual diagram that illustrates an example of a wagering game machine architecture 500, according to some embodiments. In FIG. 5, the wagering game machine architecture 500 includes a wagering game machine 506, which includes a central processing unit (CPU) 526 connected to main memory 528. The CPU 526 can include any suitable processor, such as an Intel® Pentium processor, Intel® Core 2 Duo processor, AMD Opteron™ processor, or UltraSPARC processor. The main memory 528 includes a wagering game unit 532. In some embodiments, the wagering game unit 532 can present wagering games, such as video poker, video black jack, video slots, video lottery, reel slots, etc., in whole or part.

The CPU 526 is also connected to an input/output ("I/O") bus 522, which can include any suitable bus technologies, such as an AGTL+ frontside bus and a PCI backside bus. The I/O bus 522 is connected to a payout mechanism 508, primary display 510, secondary display 512, value input device 514, player input device 516, information reader 518, and storage unit 530. The player input device 516 can include the value input device 514 to the extent the player input device 516 is used to place wagers. The I/O bus 522 is also connected to an external system interface 524, which is connected to external systems (e.g., wagering game networks). The external system interface 524 can include logic for exchanging information over wired and wireless networks (e.g., 802.11g transceiver, Bluetooth transceiver, Ethernet transceiver, etc.)

The I/O bus 522 is also connected to a location unit 538. The location unit 538 can create player information that indicates the wagering game machine's location/movements in a casino. In some embodiments, the location unit 538 includes a global positioning system (GPS) receiver that can determine the wagering game machine's location using GPS satellites. In other embodiments, the location unit 538 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 5, in some embodiments, the location unit 538 is not connected to the I/O bus 522.

In some embodiments, the wagering game machine 506 can include additional peripheral devices and/or more than one of each component shown in FIG. 5. For example, in some embodiments, the wagering game machine 506 can include multiple external system interfaces 524 and/or multiple CPUs 526. In some embodiments, any of the components can be integrated or subdivided.

In some embodiments, the wagering game machine 506 includes a web configuration module 537. The web configuration module 537 can process communications, commands, or other information, where the processing can configure browser based wagering game systems.

Furthermore, any component of the wagering game machine 506 can include hardware, firmware, and/or machine-readable storage media including instructions for performing the operations described herein.

Wagering Game Machine

Figure 6:
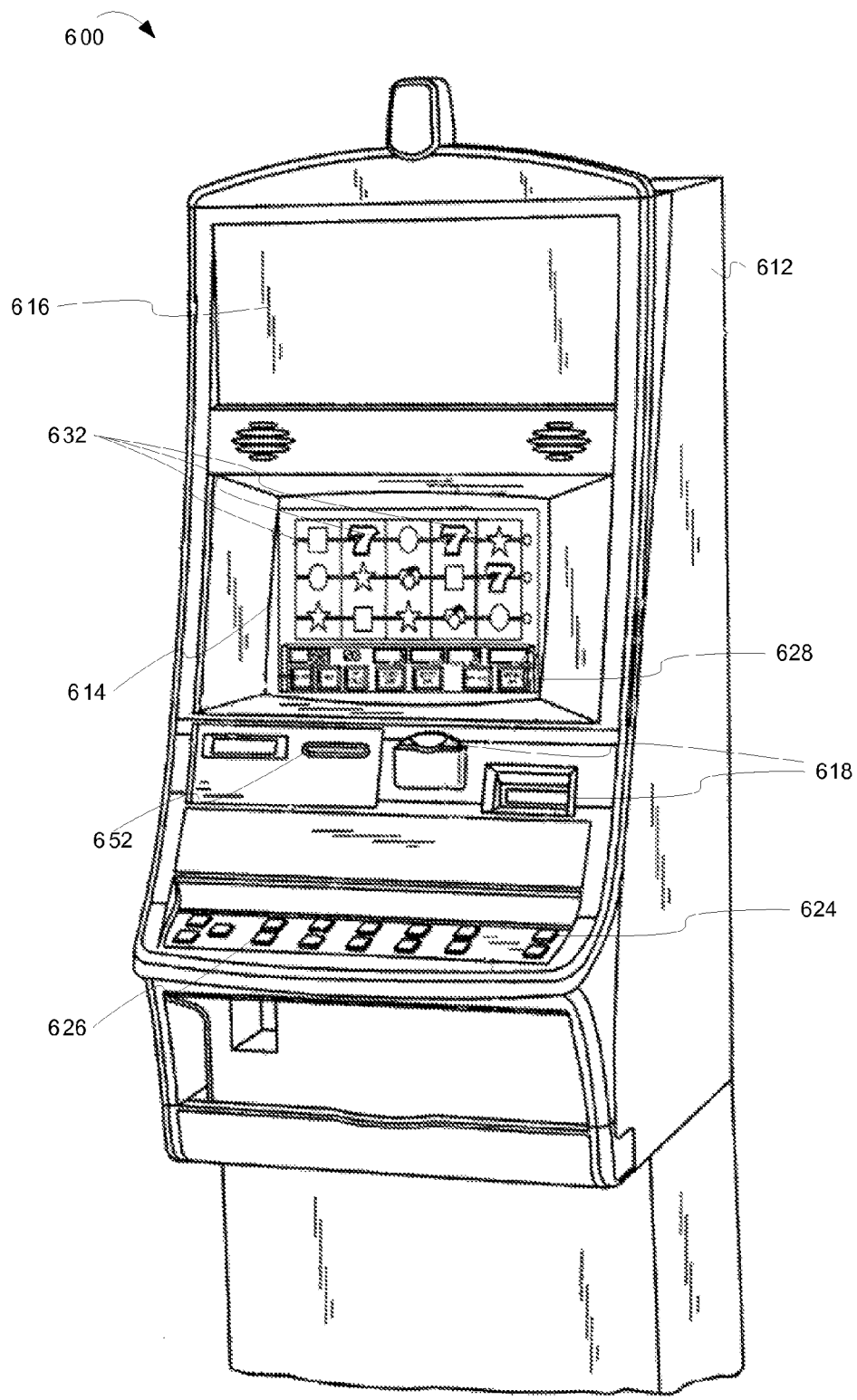
FIG. 6 is an illustration of a wagering game machine 600, according to some embodiments.

FIG. 6 is a conceptual diagram that illustrates an example of a wagering game machine 600, according to some embodiments. Referring to FIG. 6, the wagering game machine 600 can be used in gaming establishments, such as casinos. According to some embodiments, the wagering game machine 600 can be any type of wagering game machine and can have varying structures and methods of operation. For example, the wagering game machine 600 can be an electromechanical wagering game machine configured to play mechanical slots, or it can be an electronic wagering game machine configured to play video casino games, such as blackjack, slots, keno, poker, blackjack, roulette, etc.

The wagering game machine 600 comprises a housing 612 and includes input devices, including value input devices 618 and a player input device 624. For output, the wagering game machine 600 includes a primary display 614 for displaying information about a basic wagering game. The primary display 614 can also display information about a bonus wagering game and a progressive wagering game. The wagering game machine 600 also includes a secondary display 616 for displaying wagering game events, wagering game outcomes, and/or signage information. While some components of the wagering game machine 600 are described herein, numerous other elements can exist and can be used in any number or combination to create varying forms of the wagering game machine 600.

The value input devices 618 can take any suitable form and can be located on the front of the housing 612. The value input devices 618 can receive currency and/or credits inserted by a player. The value input devices 618 can include coin acceptors for receiving coin currency and bill acceptors for receiving paper currency. Furthermore, the value input devices 618 can include ticket readers or barcode scanners for reading information stored on vouchers, cards, or other tangible portable storage devices. The vouchers or cards can authorize access to central accounts, which can transfer money to the wagering game machine 600.

The player input device 624 comprises a plurality of push buttons on a button panel 626 for operating the wagering game machine 600. In addition, or alternatively, the player input device 624 can comprise a touch screen 628 mounted over the primary display 614 and/or secondary display 616.

The various components of the wagering game machine 600 can be connected directly to, or contained within, the housing 612. Alternatively, some of the wagering game machine's components can be located outside of the housing 612, while being communicatively coupled with the wagering game machine 600 using any suitable wired or wireless communication technology.

The operation of the basic wagering game can be displayed to the player on the primary display 614. The primary display 614 can also display a bonus game associated with the basic wagering game. The primary display 614 can include a cathode ray tube (CRT), a high resolution liquid crystal display (LCD), a plasma display, light emitting diodes (LEDs), or any other type of display suitable for use in the wagering game machine 600. Alternatively, the primary display 614 can include a number of mechanical reels to display the outcome. In FIG. 6, the wagering game machine 600 is an "upright" version in which the primary display 614 is oriented vertically relative to the player. Alternatively, the wagering game machine can be a "slant-top" version in which the primary display 614 is slanted at about a thirty-degree angle toward the player of the wagering game machine 600. In yet another embodiment, the wagering game machine 600 can exhibit any suitable form factor, such as a free standing model, bar top model, mobile handheld model, or workstation console model.

A player begins playing a basic wagering game by making a wager via the value input device 618. The player can initiate play by using the player input device's buttons or touch screen 628. The basic game can include arranging a plurality of symbols 632 along a pay line, which indicates one or more outcomes of the basic game. Such outcomes can be randomly selected in response to player input. At least one of the outcomes, which can include any variation or combination of symbols, can trigger a bonus game.

In some embodiments, the wagering game machine 600 can also include an information reader 652, which can include a card reader, ticket reader, bar code scanner, RFID transceiver, or computer readable storage medium interface. In some embodiments, the information reader 652 can be used to award complimentary services, restore game assets, track player habits, etc.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:
  presenting a web browser on a display associated with a wagering game machine;
  detecting a request to present wagering game content on the display, via the web browser;
  reading a web address stored in a setting associated with the wagering game machine, wherein the web address is stored in the setting prior to the request to present the wagering game content on the display;
  providing the web address to a wagering game server, via a communication network, wherein the wagering game server is configured to provide a webpage document described in the web address, wherein the wagering game content is included in the webpage document;
  receiving the webpage document from the wagering game server; and
  presenting the webpage document on the display of the wagering game machine via the web browser, in response to receiving the webpage document.

2. The computer-implemented method of claim 1, wherein the web address is stored in a memory device of the wagering game machine and further comprising initiating a boot up operation on the wagering game machine prior to the presenting the web browser on the display, wherein the boot up operation is configured to generate the request to present the wagering game content on the display, read the web address from the memory device, and transmit the web address via the communication network.

3. The computer-implemented method of claim 1 further comprising:
  logging in a user account before presenting the web browser on the display, wherein the user account has user rights to configure the wagering game machine;
  receiving the web address via user input associated with the user account; and
  storing the web address in a memory storage location associated with the wagering game machine prior to the receiving the request.

4. The computer-implemented method of claim 3, wherein the providing the web address to the wagering game server includes automatically copying the web address from the memory storage location associated with the setting and inserting the web address into an address field of the web browser.

5. The computer-implemented method of claim 1, wherein the web address is a locator to a static web address stored on a web server.

6. The computer-implemented method of claim 1, wherein the webpage document is specific to a theme and denomination for the wagering game content advertised at the wagering game machine.

7. The computer-implemented method of claim 1, wherein the presenting the web browser includes disabling user-controls of the web browser configured to navigate away from the webpage during a wagering game session.

8. The computer-implemented method of claim 1, wherein presenting the web browser comprises presenting the web browser to entirely cover the display.

9. One or more machine-readable storage media having instructions stored thereon, which when executed by a set of one or more processors causes the set of one or more processors to perform operations comprising:
  detecting a request to present wagering game content via a web browser associated with a wagering game machine, wherein a web address is associated with the request, wherein the web address is stored in a setting associated with the wagering game machine prior to the request;
  generating a webpage document associated with the web address, wherein the wagering game content is included in the webpage document; and
  providing the webpage document for presentation via the web browser.

10. The one or more machine-readable storage media of claim 9 said operations further comprising:
  evaluating gaming conditions against content presentation rules, wherein the gaming conditions represent a state of a gaming session when the request is made to present the wagering game content, and wherein the conditions are associated with one or more of a player preference, a player game history, a network time, a network date, a player status, a patron population, a wagering game machine status, and a popularity of a wagering game; and
  selecting the wagering game content based on the evaluating of the conditions against the content presentation rules.

11. The one or more machine-readable storage media of claim 9, said operations further comprising:
  detecting a unique identifier associated with the wagering game machine in response to detecting the request to present the wagering game content via the web browser;
  accessing a webpage template assigned to the unique identifier; and
  generating the webpage document based on the webpage template.

12. The one or more machine-readable storage media of claim 11, wherein the operation of generating the webpage document based on the webpage template includes operations comprising:
  reading web document code included in the webpage template, wherein the web document code specifies sections of the webpage document, and wherein the web document code specifies a content identifier for each of the sections; and
  embedding different content into each of the sections of the webpage document using the content identifier for the each of the sections.

13. The one or more machine-readable storage media of claim 12, wherein a first of the content identifiers for a first of the sections specifies a first type of wagering game content, wherein a second of the content identifiers for a second of the sections specifies a second type of wagering game content different from the first wagering game content, and wherein said operation for embedding the different content into each of the sections of the webpage document includes operations comprising:

embedding into the first of the sections a first web application that corresponds to the first type of wagering game content; and embedding into the second of the sections a second web application that corresponds to the second type of wagering game content.

14. The one or more machine-readable storage media of claim 13, wherein the first web application and the second web application are vector graphic animations with wagering game control scripting.

15. The one or more machine-readable storage media of claim 11, wherein the unique identifier is a serial number for the wagering game machine.

16. The one or more machine-readable storage media of claim 11, wherein said operation of detecting the unique identifier associated with the wagering game machine comprises one or more of obtaining the unique identifier from data associated with the request, querying the wagering game machine for the unique identifier, and accessing a database that indicates the unique identifier.

17. The one or more machine-readable storage media of claim 11, wherein said operation of accessing the webpage template assigned to the unique identifier includes operations comprising searching a database for a relationship between a first database value that specifies the unique identifier and a second database value that specifies the webpage template.

18. A system comprising:
one or more processors; and
one or more memory storage devices configured to store instructions, which when executed by at least one of the one or more processors cause the system to perform operations to
detect a request to present wagering game content via a web browser of a wagering game machine, wherein a web address is associated with the request, wherein the web address is stored in a setting associated with the wagering game machine prior to the request;
generate a webpage document associated with the web address, wherein the wagering game content is included in the webpage document; and
provide the webpage document for presentation via the web browser.

19. The system of claim 18, wherein the setting associated with the wagering game machine is stored in a memory device of the wagering game machine and wherein the one or more memory storage devices are configured to store instructions, which when executed by the one or more processors cause the system to perform operations to initiate a boot up operation on the wagering game machine prior to detecting the request, read the web address from the memory device, and transmit the web address via a communication network.

20. The system of claim 18, wherein the webpage document is specific to a theme and denomination for the wagering game machine.

21. The system of claim 18, wherein the one or more memory storage devices are configured to store instructions, which when executed by the at least one of the one or more processors cause the system to perform operations to one or more of disable a user-control of the web browser configured to navigate away from the webpage and present the web browser to entirely cover the display.

22. The system of claim 18, wherein the one or more memory storage devices are configured to store instructions, which when executed by the at least one of the one or more processors cause the system to perform operations to:
detect a unique identifier associated with the wagering game machine;
access a webpage template assigned to the unique identifier; and
generate the webpage document based on the webpage template.

23. The system of claim 22, wherein the operation to generate the webpage document based on the webpage template includes operations to:
read web document code included in the webpage template, wherein the web document code specifies sections of the webpage document, and wherein the web document code specifies a content identifier for each of the sections; and
include different content in each of the sections of the webpage document using the content identifier for the each of the sections.

24. The system of claim 23, wherein a first of the content identifiers for a first of the sections specifies a first type of wagering game content, wherein a second of the content identifiers for a second of the sections specifies a second type of wagering game content different from the first wagering game content, and wherein said operation to include the different content in each of the sections of the webpage document includes operations to:
embed into the first of the sections a first web application that corresponds to the first type of wagering game content; and
embed into the second of the sections a second web application that corresponds to the second type of wagering game content.

25. The system of claim 24, wherein the first web application and the second web application are vector graphic animations with wagering game control scripting.

26. The system of claim 22, wherein the unique identifier is a serial number for the wagering game machine.

27. The system of claim 18, wherein the one or more memory storage devices are configured to store instructions, which when executed by the at least one of the one or more processors cause the system to perform operations to:
access a wagering game player account logged on to the wagering game machine;
determine a player preference stored in the wagering game player account, wherein the player preference describes a preference for a type of the wagering game content;
select a webpage template associated with the type of the wagering game content; and
use the webpage template to generate the webpage document.

* * * * *